United States Patent
Koh et al.

(10) Patent No.: US 7,433,158 B2
(45) Date of Patent: Oct. 7, 2008

(54) SHIPPING COMB FOR MOVING ACTUATOR OF HARD DISK DRIVE

(75) Inventors: Jeong-seok Koh, Yongin-si (KR); Haeng-soo Lee, Suwon-si (KR); Yong-kyu Byun, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 427 days.

(21) Appl. No.: 11/201,435

(22) Filed: Aug. 11, 2005

(65) Prior Publication Data
US 2006/0117558 A1 Jun. 8, 2006

(30) Foreign Application Priority Data
Dec. 7, 2004 (KR) .................... 10-2004-0102210

(51) Int. Cl.
*G11B 5/54* (2006.01)
(52) U.S. Cl. .................................. 360/254.7
(58) Field of Classification Search ............... 360/254.7
See application file for complete search history.

(56) References Cited

U.S. PATENT DOCUMENTS 5,984,104 A * 11/1999 Schott et al. ............... 206/728
6,687,093 B1 2/2004 Butler et al.

* cited by examiner

*Primary Examiner*—David D Davis
(74) *Attorney, Agent, or Firm*—Sughrue Mion, PLLC

(57) ABSTRACT

A shipping comb for use when moving an actuator of a hard disk drive, the actuator including a swing arm installed on a base member of the hard disk drive capable of pivoting, at least a pair of load beams coupled to an end portion of the swing arm, and at least a pair of sliders respectively coupled to the load beams to face each other. The shipping comb includes a frame operative to be coupled to the actuator and capable of pivoting, a first finger provided at the frame and for maintaining an interval between the load beams by being inserted between the load beams, and a second finger provided at the frame and for preventing collision between the sliders by being inserted between the sliders.

17 Claims, 8 Drawing Sheets

SHIPPING COMB FOR MOVING ACTUATOR OF HARD DISK DRIVE

CROSS-REFERENCE TO RELATED PATENT APPLICATIONS

This application claims priority from Korean Patent Application No. 10-2004-0102210, filed on Dec. 7, 2004, in the Korean Intellectual Property Office, the disclosure of which is incorporated herein in its entirety by reference.

BACKGROUND OF THE INVENTION

1. Field of the Invention

The present invention relates to a shipping comb for use when moving an actuator of a hard disk drive and, more particularly, to a shipping comb for use when moving an actuator of a hard disk drive having a structure which can prevent collision between sliders, each mounting a read/write head, during the movement of an actuator.

2. Description of the Related Art

A hard disk drive (HDD), which is one of a number of information storing devices for computers, reproduces data stored from a disk or records data on the disk using a read/write head. In the HDD, the read/write head is mounted on a slider installed on an actuator. The actuator moves the head to a desired position on the rotating disk.

FIG. 1 is a plan view illustrating a structure of a conventional hard disk drive. Referring to FIG. 1, the conventional hard disk drive includes a spindle motor 12 installed on a base member 10, at least one disk 20 fixed to the spindle motor 12, and an actuator 30 moving a read/write head (not shown) for reproducing and recording data to a predetermined position on the disk 20. The actuator 30 includes a swing arm 32 installed on the base member 10 capable of pivoting around an actuator pivot 31, a suspension assembly 40 installed at an end portion of the swing arm 32 and supporting the slider 44 mounting the read/write head to be elastically biased toward a surface of the disk 20, and a voice coil motor (VCM) 36 rotating the swing arm 32. The VCM 36 includes a VCM coil 37 coupled to the other end portion of the swing arm 32 and a magnet 38 arranged to face the VCM coil 37.

The VCM 36 configured as above is controlled by a servo control system to rotate the swing arm 32 in a direction following the Fleming's Left Hand Rule by an interaction between current applied to the VCM coil 37 and a magnetic field formed by the magnet 38. That is, when the power of the hard disk drive is on and the disk 20 starts to rotate in a direction D, the VCM 36 rotates the swing arm 32 counterclockwise in a direction A to move the slider 44 mounting the read/write head toward a recording surface of the disk 20. The slider 44 is lifted by a lift force generated by the rotating disk 20 to a predetermined height from the surface of the disk 20. In this state, the read/write head mounted on the slider 44 reproduces data or records data with respect to the recording surface of the disk 20.

When the hard disk drive is not in use, that is, the rotation of the disk 20 is stopped, the read/write head is parked at a position outside the recording surface of the disk 20 to prevent the read/write head from colliding against the recording surface of the disk 20. For this purpose, a ramp 50 is installed outside the disk 20 and an end-tab 45 supported by the ramp 50 is provided on the suspension assembly 40. When the power of the hard disk drive is off and the disk 20 stops rotation, the VCM 36 rotates the swing arm 32 clockwise in a direction B. Accordingly, the end-tab 45 is moved from the disk 20 to the ramp 50 and supported by the ramp 50.

FIG. 2 is a perspective view illustrating the actuator shown in FIG. 1 and the conventional shipping comb installed thereon. FIG. 3 is a side view illustrating a state in which the conventional shipping comb shown in FIG. 2 is installed on the actuator.

Referring to FIGS. 2 and 3, the actuator 30 is generally referred to as a head-stack assembly (HSA) and has a plurality of heads corresponding to the number of the recording surfaces of the disk 20. Each of the heads is mounted on the slider 44 which is supported by the suspension assembly 40. Thus, the same number of the suspension assemblies 40 as that of the heads is provided at the actuator 30. Each of the suspension assemblies 40 includes a load beam 41 coupled to an end portion of the swing arm 32 and a flexure 43 attached to the load beam 41. The end-tab 45 is extended from a front end portion of the load beam 41. The slider 44 is attached to the flexure 43. The rear end portion of the flexure 43 is attached to a surface of the load beam 41 that faces the disk 20 while the front end portion thereof is formed to freely move up and down. A dimple 42 is formed at the load beam 41. The dimple 42 provides a predetermined elastic force to the flexure 43. By this structure, the flexure 43 can freely move and accordingly pitching and rolling of the slider 44 attached to the flexure 43 is smoothly accomplished.

The actuator 30 configured as above is installed on the base member 10 of the hard disk drive after it is separately manufactured. While the actuator 30 is being transferred for this purpose, impact or vibration may be applied to the actuator 30. In this case, the sliders 44 arranged to face each other may collide with each other and be damaged accordingly. To prevent this problem, a shipping comb 60 is installed in the actuator 30.

The shipping comb 60 includes a frame 61, an installation rod 62a and a handle 62b provided at an end portion of the frame 61, and a finger 63 provided at the other end portion of the frame 61. The installation rod 62a of the shipping comb 60 is inserted in an installation hole 34 formed in the swing arm 32 of the actuator 30 while the finger 63 is inserted between the load beams 41 facing each other to maintain a constant gap therebetween. The handle 62b is used to pivot the shipping comb 60.

However, it is a problem that, when the conventional shipping comb 60 is installed at the actuator 30, the sliders 44 facing each other may still collide with each other and be damaged thereby. That is, the conventional shipping comb 60 does not have a structure directly to prevent the collision between the sliders 44. Accordingly, during the transfer of the actuator 30, when a relatively large impact or vibration is applied to the actuator 30, the sliders 44 greatly vibrate and thus the sliders 44 facing each other may collide with each other. In this case, an air bearing surface of each of the sliders 44 may be damaged or the head mounted thereon may be damaged so that a lifting ability of the slider 44 or a read/write ability of the head may be deteriorated.

SUMMARY OF THE INVENTION

To solve the above and/or other problems, the present invention provides a shipping comb for use when moving an actuator of a hard disk drive having a structure for preventing with improved reliability collision between sliders due to impact or vibration.

According to an aspect of the present invention, a shipping comb for use when moving an actuator of a hard disk drive, the actuator including a swing arm installed on a base member of the hard disk drive and capable of pivoting, at least a pair of load beams coupled to an end portion of the swing arm, and at least a pair of sliders respectively coupled to the load beams to face each other, comprises a frame operative to be coupled to the actuator and capable of pivoting, a first finger provided at the frame and maintaining an interval between the load beams by being inserted between the load beams, and a second finger provided at the frame and for preventing collision between the sliders by being inserted between the sliders.

The first finger and the second finger are integrally formed with the frame. The first finger and the second finger horizontally protrude from the frame. As the frame is coupled to the actuator and rotated in a first direction, the first finger is inserted between the load beams and then the second finger is inserted between the sliders. A length of the first finger is greater than that of the second finger.

The first finger is integrally formed with the frame and the second finger is hinge-coupled to the frame and capable of pivoting by a predetermined angle. The first finger horizontally protrudes from the frame and the second finger is capable of horizontally pivoting. Two hinge coupling protrusions protrude from the frame with a predetermined interval, a rear end portion of the second finger is inserted between the two hinge coupling protrusions, and a pin insertion hole, into which a hinge pin is inserted, is coaxially formed in each of the hinge coupling protrusions and the rear end portion of the second finger. The first finger is inserted between the load beams as the frame is coupled to the actuator and rotated in a first direction, and then the second finger is inserted between the sliders as the second finger is rotated in the first direction.

An installation hole is formed in the swing arm of the actuator and an installation rod to be inserted in the installation hole is provided at an end portion of the frame.

A tip end portion of the first finger is inclined to allow the first finger to be easily inserted between the load beams. The first finger contacts and supports each of the load beams in a state in which the first finger is inserted between the load beams.

The second finger has a thickness smaller than an interval between the sliders so as not to contact the sliders when the second finger is inserted between the sliders. A tip end portion of the second finger facing the sliders has a shape corresponding to the shape of each of the sliders.

The shipping comb is formed of a conductive plastic material. The conductive plastic material includes carbon fiber.

The first finger and the second finger are formed of different materials. The second finger is formed of a material softer than the first finger.

A buffer member is attached to at least each of upper and lower surfaces of a tip end portion of the second finger. The buffer member is formed of a viscoelastic material.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE INVENTION

Figure 1:
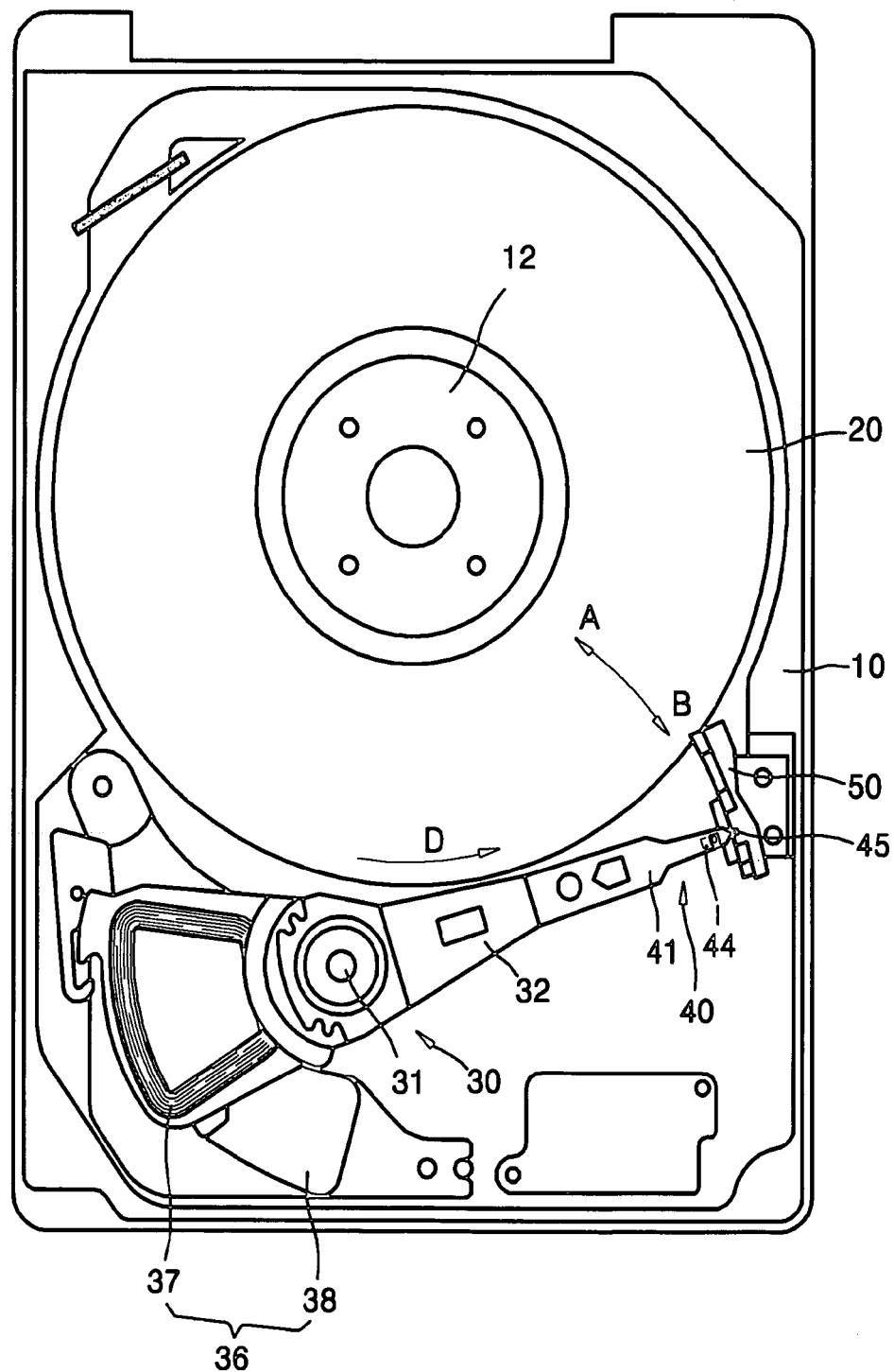
FIG. 1 is a plan view illustrating a structure of a conventional hard disk drive.
Figure 2:
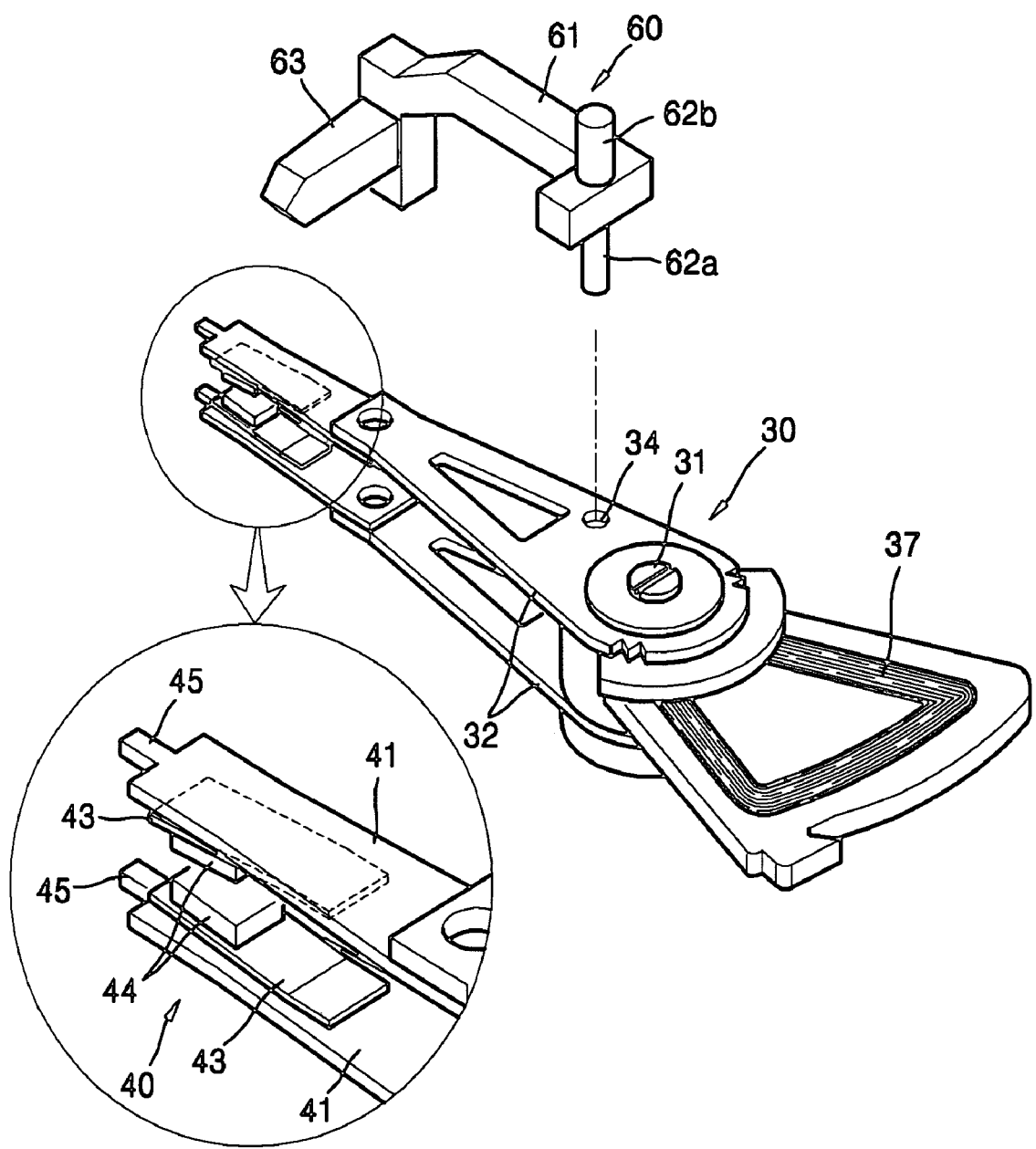
FIG. 2 is a perspective view of an actuator shown in FIG. 1 and a conventional shipping comb installed thereon.
Figure 3:
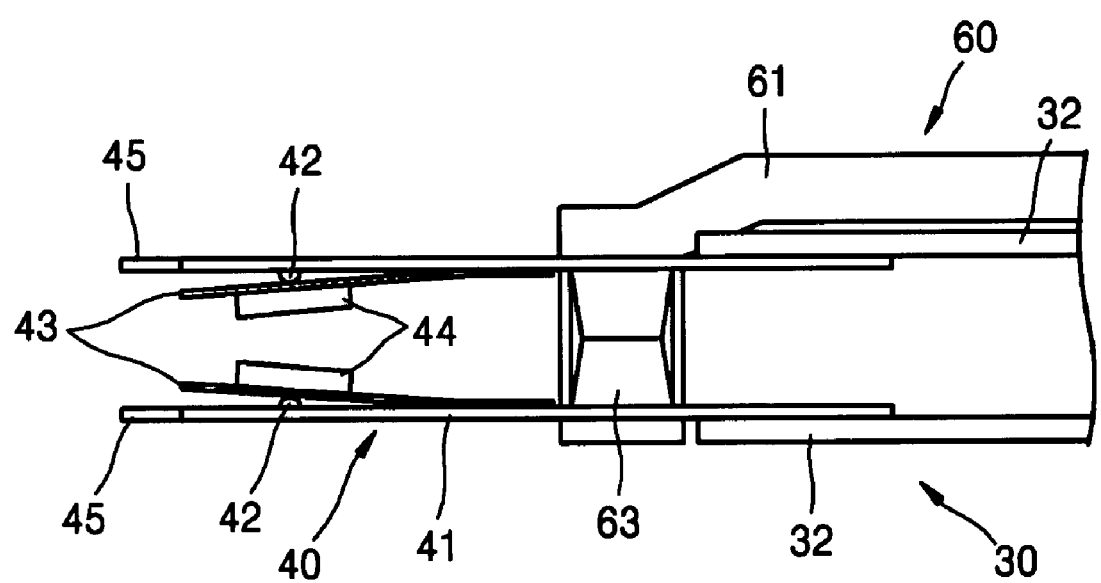
FIG. 3 is a side view illustrating a state in which the conventional shipping comb of FIG. 2 is installed at the actuator.
Figure 4:
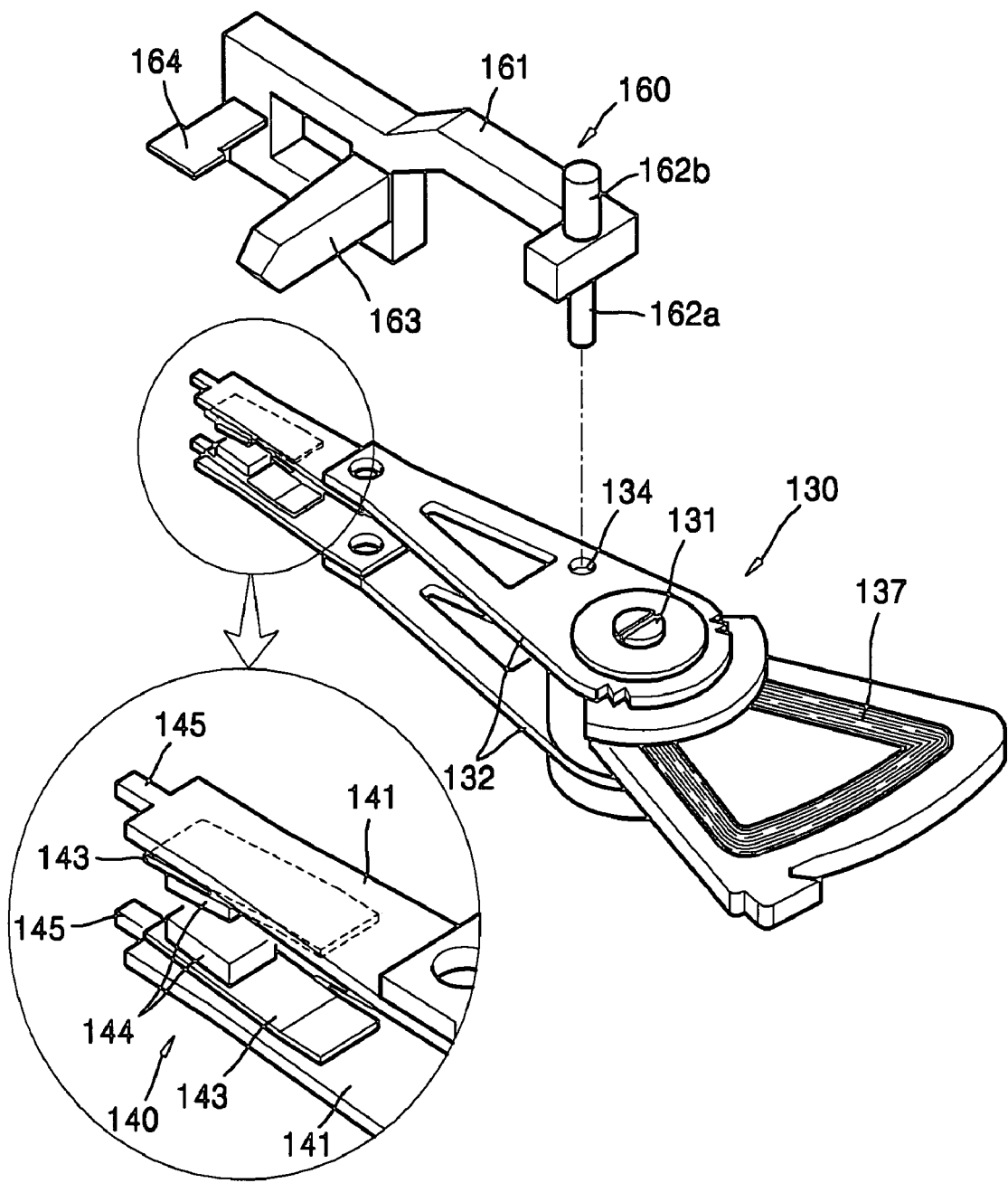
FIG. 4 is a perspective view illustrating a shipping comb for moving an actuator of a hard disk drive according to an exemplary embodiment of the present invention and the actuator.
Figure 5:
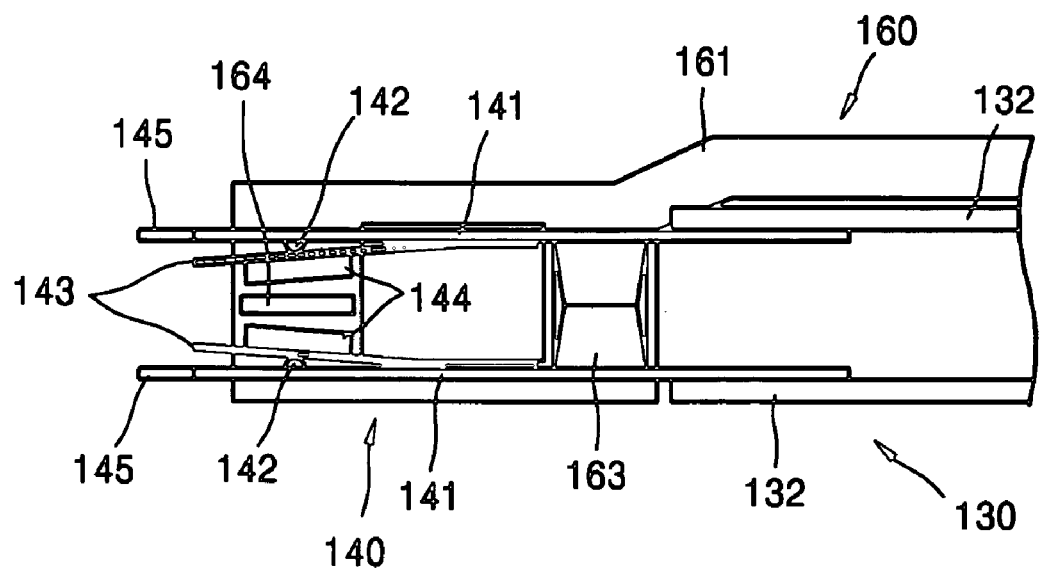
FIG. 5 is a side view illustrating a state in which the shipping comb of FIG. 4 is installed at the actuator.

FIG. 4 is a perspective view illustrating a shipping comb for use when moving an actuator of a hard disk drive according to an illustrative, non-limiting embodiment of the present invention and the actuator. FIG. 5 is a side view illustrating a state in which the shipping comb of FIG. 4 is installed at the actuator. Referring to FIGS. 4 and 5, a shipping comb 160 according to an exemplary embodiment of the present invention is installed at an actuator 130 of the hard disk drive to prevent collision between the sliders 144 which may occur during the transfer of the actuator 130, for example, during transport of the actuator 130 from one manufacturing location to another manufacturing location.

The actuator 130 for moving a read/write head for reproducing and recording data to a predetermined position on a disk includes a swing arm 132 installed capable of pivoting a base member of a hard disk drive and at least a pair of suspension assemblies 140, each being coupled to an end of the swing arm 132 and supporting the slider 144 mounting the head elastically biased toward a surface of the disk.

An actuator pivot 131 is coupled to a center portion of the swing arm 132. a VCM coil 137 of a voice coil motor which supplies a driving power to rotate the swing arm 132 clockwise or counterclockwise is coupled to the other end portion of the swing arm 132.

The number of the suspension assemblies 140 coupled to an end portion of the swing arm 132 is determined by the number of disks. For example, when a single disk is installed in the hard disk drive, as shown in FIGS. 4 and 5, two sliders 144 corresponding to upper and lower surfaces of the disk are needed. A pair of the suspension assemblies 140 to support the two sliders 144 are provided. When two or more disks are installed in the hard disk drive, four or more sliders 144 corresponding to upper and lower surfaces of each disk are needed. Accordingly, two or more pairs of the suspension assemblies 140 are provided to support four or more of the sliders 144.

The shipping comb 160 according to an exemplary embodiment of the present invention is described below based on the actuator 130 having a pair of the suspension assemblies 140 in the hard disk drive having a single disk for the convenience of explanation.

The suspension assemblies 140 have a pair of load beams 141 coupled to the end portion of the swing arm 132 and a pair of the sliders 144, each being coupled to the load beams 141 to face each other. In detail, a flexure 143 is attached to a surface of each of the load beams 141 facing the disk. Each of the sliders 144 is attached to the flexure 143 and supported thereon. A rear end portion of the flexure 143 is fixedly attached to the surface of each of the load beams 141 facing the disk while a front end portion thereof is formed to freely move up and down. A dimple 142 is formed at each of the load beams 141. The dimple 142 provides a predetermined elastic force to the flexure 143. By this structure, the front end portion of the flexure 143 can freely move and accordingly pitching and rolling of each of the sliders 144 attached to the flexure 143 is smoothly accomplished. An end-tab 145 for parking the read/write head on a ramp may be provided on each of the load beams 141.

The shipping comb 160 consistent with the present invention is detachably installed at the actuator 130 configured as above. The shipping comb 160 includes a frame 161 operative to be coupled to the actuator 130 and two fingers 163 and 164 provided at the frame 161.

The frame 161 is coupled to the swing arm 132 of the actuator 130 to be capable of pivoting. For this purpose, an installation rod 162a protrudes from an end portion of the frame 161 and an installation hole 134 is formed on the swing arm 130. As the installation rod 162a is inserted in the installation hole 134, the frame 161 is coupled to the swing arm 132 to be capable of pivoting. A handle 162b may be provided at an end portion of the frame 161 to protrude in the direction opposite to the installation rod 162a.

The first finger 163 of the two fingers 163 and 164 horizontally protrudes from an approximately middle portion of the frame 161 and is inserted between the load beams 141. A tip end portion of the first finger 163 is inclined to be easily inserted between the load beams 141. Upper and lower surfaces of the first finger 163 inserted between the load beams 141 contact the respective load beams 141. For this purpose, the first finger 163 has the substantially same thickness as a gap between the load beams 141. Since the load beams 141 contact the first finger 163 and are supported thereby, the gap between the load beams 141 can be maintained constant.

The second finger 164 of the two fingers 163 and 164 horizontally protrudes from the other end of the frame 161 and is inserted between the sliders 144. The second finger 164 has a thickness smaller than a gap between the sliders 144. Thus, since the second finger 164 does not contact the sliders 144 when inserted between the sliders 144, the second finger 164 is easily inserted between the sliders 144. Upper and lower surfaces of the second finger 164 inserted between the sliders 144 are separated a predetermined distance from the respective sliders 144. Accordingly, when impact or vibration is not applied to the actuator 130, the sliders 144 do not contact the second finger 164.

The tip end portion of the second finger 164, that is, a portion facing the sliders 144, has a shape corresponding to the shape of the sliders 144. For example, the tip end portion of the second finger 164 may have a rectangular shape having an area larger than that of each of the sliders 144.

As described above, as the second finger 164 is inserted between the sliders 144 facing each other, even when a relatively large impact or vibration is applied from the outside during the transfer of the actuator 130, the direct collision between the sliders 144 can be prevented by the second finger 164. Also, when the sliders 144 vibrate due to impact or vibration and thus contact the second finger 164, since a gap between each of the sliders 144 and the second finger 164 is small, a range of vibration of the sliders 144 is remarkably reduced, compared to the prior art. Thus, even if the sliders 144 contact the second finger 164, the sliders 144 and the head mounted thereon are hardly damaged.

The shipping comb 160 according to an exemplary embodiment of the present invention may be manufactured by plastic injection molding. The frame 161, the installation rod 162a, the handle 162b, and the first and second fingers 163 and 164 may be integrally formed. The frame 161, the installation rod 162a, the handle 162b, and the first and second fingers 163 and 164 may be manufactured by using a single sort of a plastic material. To prevent electrostatic discharge (ESD) which may degrade performance of the head, for example, a conductive plastic material including carbon fiber of about 15% is used.

The shipping comb 160 may be integrally formed by injection molding using two different plastic materials. In detail, the frame 161, the installation rod 162a, the handle 162b, and the first finger 163 are formed of the same first material, while the second finger 164 may be formed of a second material different from the first material. In this case, since the frame 161, the installation rod 162a, the handle 162b, and the first finger 163 are structurally coupled to the actuator 130 or contact the same, a material exhibiting a relatively higher rigidity is used therefor. However, since the second finger 164 contacts the sliders 144 when impact or vibration is applied to the actuator 130, the second finger 164 is formed of a relatively soft material to absorb the impact generated due to the collision with the sliders 144.

Figure 6:
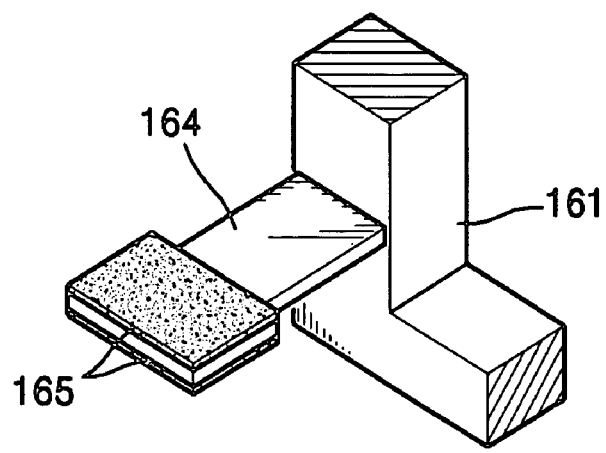
FIG. 6 is a perspective view illustrating a modified example of a second finger of the shipping comb shown in FIG. 4.

FIG. 6 is a perspective view illustrating a modified example of a second finger of the shipping comb shown in FIG. 4. Referring to FIG. 6, a buffer member 165 may be attached to the upper and lower surfaces of at least the tip end portion of the second finger 164. The buffer member 165 may be formed of a viscoelastic material having a superior buffering property such as insulation rubber or silicon rubber.

According to the above structure, since the buffer member 165 absorbs impact generated due to contact between the second finger 164 and the slider 144, damage to the air bearing surface of the slider 144 and the head mounted thereon can be effectively prevented.

The process of installing the shipping comb 160 according to the present embodiment configured as above on the actuator 130 is described below.

Figure 7:
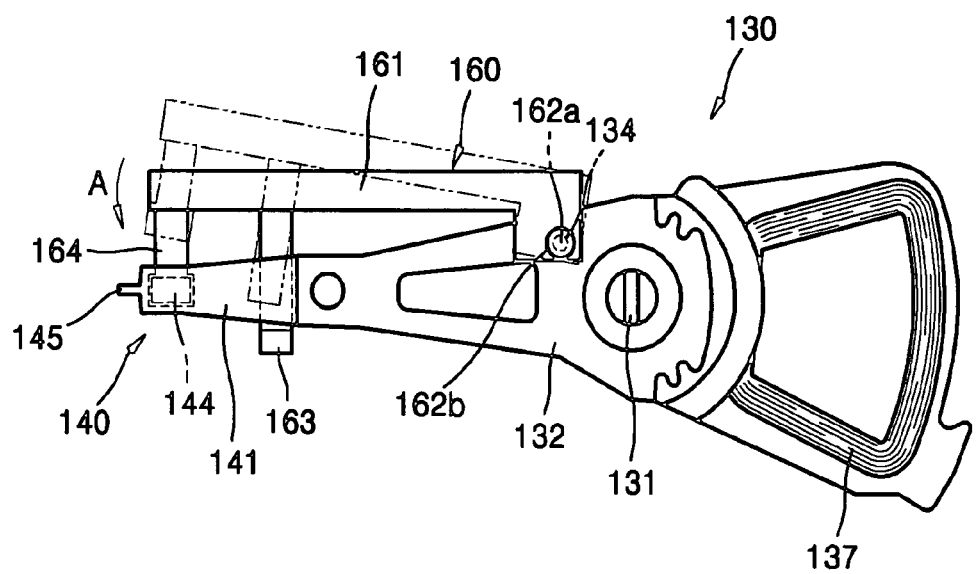
FIG. 7 is a plan view for explaining a process of installing the shipping comb of FIG. 4 at the actuator.

FIG. 7 is a plan view for explaining a process of installing the shipping comb of FIG. 4 on the actuator. Referring to FIG. 7, the installation rod 162a of the shipping comb 160 is inserted in the installation hole 134 of the swing arm 132. Next, the frame 161 is rotated using the handle 162b around the installation rod 162a by a predetermined angle in a direction A. As the first finger 163 is inserted between the load beams 141, the load beams 141 are separated a predetermined distance from each other. Accordingly, the interval between the sliders 144 facing each other increases. When the frame 161 is continuously rotated in the direction A, the second finger 164 is inserted between the sliders 144 facing each other. Since the interval between the sliders 144 facing each other is already increased, the second finger 164 can be easily inserted between the sliders 144 without contacting the sliders 144.

In the shipping comb 160 according to the present embodiment, the first finger 163 and the second finger 164 are sequentially and continuously inserted between the load beams 141 and the sliders 144, respectively, by a single pivotal movement of the frame 161. To ensure that the above process is performed smoothly, the length of the first finger 163 is greater than that of the second finger 164.

Figure 8:
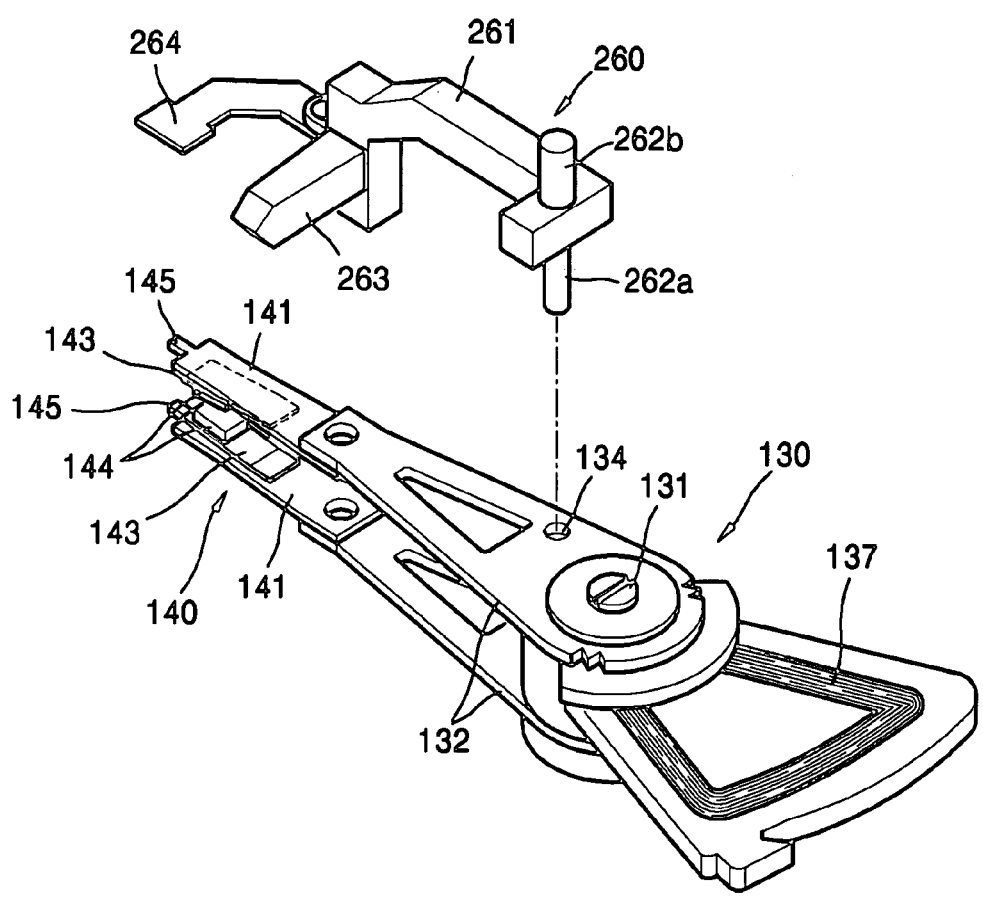
FIG. 8 is a perspective view illustrating a shipping comb for moving an actuator of a hard disk drive according to another exemplary embodiment of the present invention and the actuator.
Figure 9:
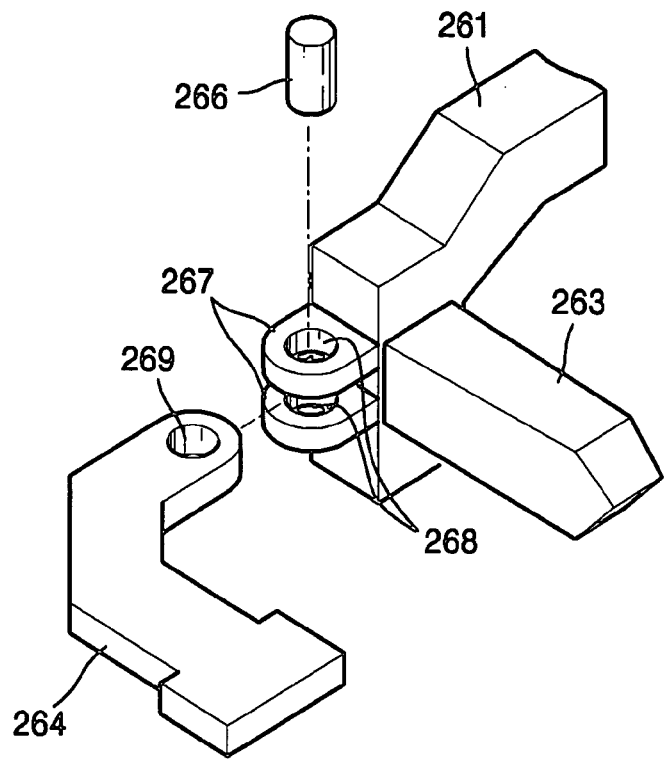
FIG. 9 is a perspective view illustrating a hinge coupling structure of the second finger of FIG. 8.
Figure 10:
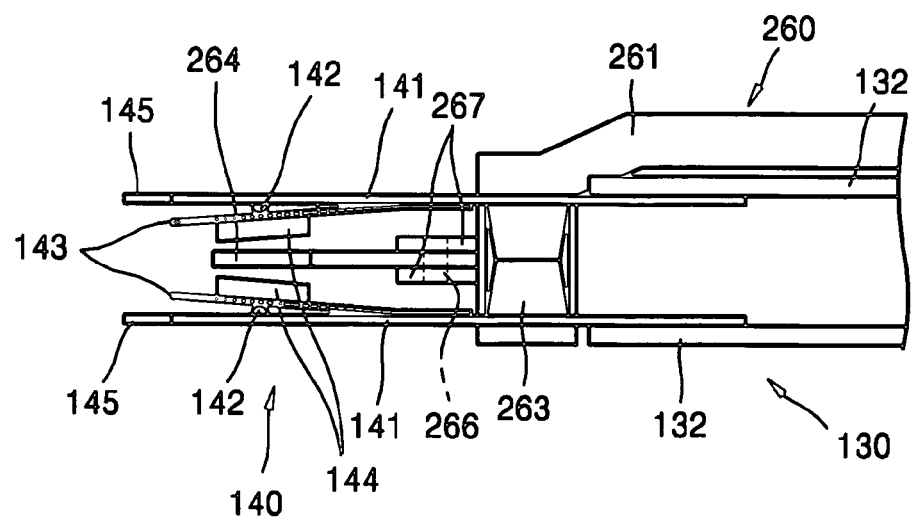
FIG. 10 is a side view illustrating a state in which the shipping comb of FIG. 8 is installed at the actuator.

FIG. 8 is a perspective view illustrating a shipping comb for moving an actuator of a hard disk drive consistent with another embodiment of the present invention and the actuator. FIG. 9 is a perspective view illustrating a hinge coupling structure of the second finger of FIG. 8. FIG. 10 is a side view illustrating a state in which the shipping comb of FIG. 8 is installed at the actuator.

Referring to FIGS. 8 through 10, a shipping comb 260 according to another embodiment of the present invention includes a frame 261 coupled to the actuator 130, a first finger 263 integrally formed with the frame 261, and a second finger 264 hinge-coupled to the frame 261 capable of pivoting by a predetermined angle.

The frame 261 is pivotally coupled to the swing arm 132 by an installation rod 262a protruding from an end portion of the frame 261 and which is inserted in the installation hole 134 formed in the swing arm 132. The first finger 263 horizontally protrudes from the frame 261 to be inserted between the load beams 141 so that the interval between the load beams 141 is maintained. Since the structure and operation of the frame 261 and the first finger 263 are the same as those of the above-described previous embodiment, a detailed description thereof will be omitted herein.

The second finger 264 is inserted between the sliders 144 by being hinge-coupled to the frame 261 and horizontally pivoting. The second finger 264 and the frame 261 are hinge-coupled in a variety of manners known to those skilled in the art. For example, two hinge couple protrusions 267 protruding from the frame 261 with a predetermined interval therebetween and a rear end portion of the second finger 264 is inserted between the two hinge coupling protrusions 267. A pin insertion hole 268 is coaxially formed at each of the hinge coupling protrusions 267 and the rear end portion of the second finger 264 so that a hinge pin 266 is inserted in the pin insertion hole 268.

The second finger 264 has a thickness smaller than the interval between the sliders 144. The tip end portion of the second finger 264 may have a shape corresponding to the shape of each of the sliders 144, for example, a rectangular shape having an area larger than that of each of the sliders 144. Since the characteristics and operation of the second finger 264 are the same as those of the above-described previous embodiment, a detailed description thereon will be omitted herein.

The second finger 264 configured as above is inserted between the sliders 144 to prevent a direct collision between the sliders 144. Since the operation and effect of the second finger 264 are the same as those of the above-described previous embodiment, a detailed description thereof will be omitted herein.

The shipping comb 260 according to this embodiment may be manufactured by plastic injection molding. While the frame 261, the installation rod 262a, the handle 262b, and the first finger 263 are integrally manufactured, the second finger 264 is separately manufactured. Like the above-described previous embodiment, while all of the frame 261, the installation rod 262a, the handle 262b, the first finger 263, and the second finger 264 may be manufactured using a single plastic material, the second finger 264 may be manufactured using other plastic material. Using a conductive plastic material including about 15% carbon fiber as the plastic material can prevent the ESD. Manufacturing the second finger 264 using a material softer than the first finger 263 can effectively absorb an impact due to contact between the second finger 264 and the sliders 144.

In the shipping comb 260 according to this embodiment, the buffer member 165 capable of absorbing an impact due to the contact between the second finger 264 and the sliders 144, as shown in FIG. 6, may be attached to at least the upper and lower surfaces of the tip end portion of the second finger 264.

The process of installing the shipping comb 260 configured as above according to this embodiment at the actuator 130 is described below.

Figure 11:
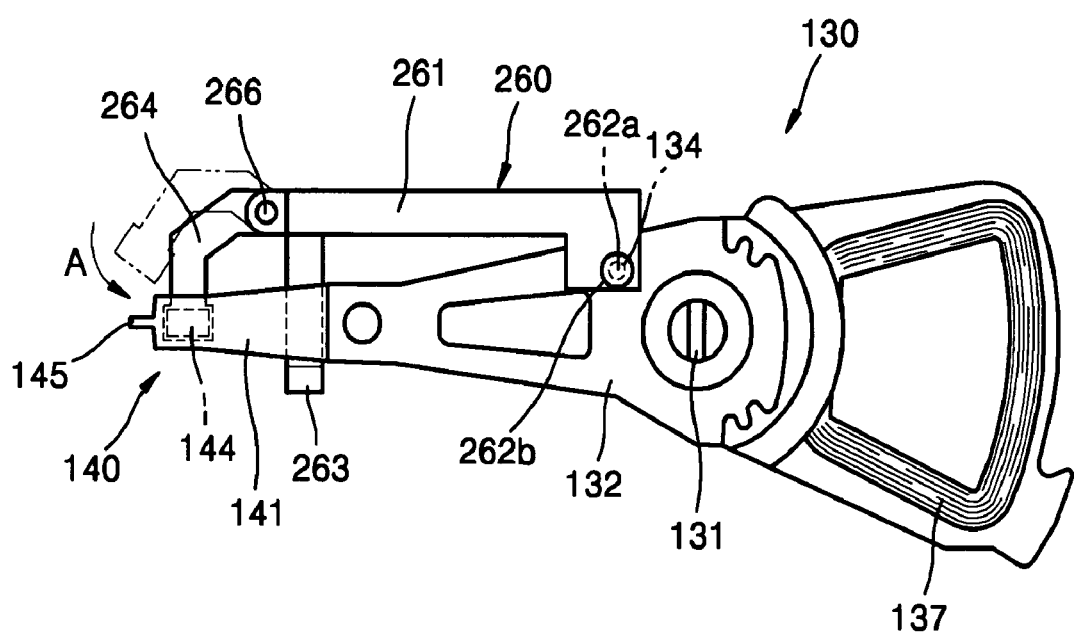
FIG. 11 is a plan view for explaining a process of installing the shipping comb of FIG. 8 at the actuator.

FIG. 11 is a plan view for explaining a process of installing the shipping comb of FIG. 8 at the actuator. Referring to FIG. 11, the installation rod 262a of the shipping comb 260 is inserted in the installation hole 134 of the swing arm 132. Next, the frame 261 is rotated using the handle 262b by a predetermined angle around the installation rod 262a in the direction A. Then, as the first finger 263 is inserted between the load beams 141, the load beams 141 are separated from each other to have a predetermined interval therebetween. Accordingly, the interval between the sliders 144 facing each other increases. Next, the second finger 264 is rotated around the hinge pin 266 in the direction A to be inserted between the sliders 144 facing each other. Since the interval between the sliders 144 facing each other is already increased, the second finger 264 can be easily inserted between the sliders 144 without contacting the sliders 144.

In the shipping comb 260 according to this embodiment, the first finger 263 is inserted between the load beams 141 by the rotation of the frame 261 and then the second finger 264 is inserted between the sliders 144 by the rotation of the second finger 264.

As described above, with the shipping comb for use when moving the actuator according to the present invention, the collision between the sliders can be prevented with improved reliability when a relatively large impact or vibration is applied from the outside during the transfer of the actuator. Thus, the damage to the air bearing surface of the slider and the read/write head due to the collision between the sliders is prevented.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A shipping comb for use when moving an actuator of a hard disk drive, the actuator including a swing arm installed on a base member of the hard disk drive and capable of pivoting, at least a pair of load beams coupled to an end portion of the swing arm, and at least a pair of sliders respectively coupled to the load beams to face each other, the shipping comb comprising:

a frame operative to be coupled to the actuator and capable of pivoting;

a first finger provided at the frame and for maintaining an interval between the load beams by being inserted between the load beams; and a second finger provided at the frame and for preventing collision between the sliders by being inserted between the sliders, wherein the first finger is integrally formed with the frame and the second finger is hinge-coupled to the frame and capable of pivoting by a predetermined angle with respect to the frame.

2. The shipping comb as claimed in claim 1, wherein the first finger horizontally protrudes from the frame and the second finger is capable of horizontally pivoting.

3. The shipping comb as claimed in claim 1, wherein two hinge coupling protrusions protrude from the frame with a predetermined interval, a rear end portion of the second finger is inserted between the two hinge coupling protrusions, and a pin insertion hole, into which a hinge pin is inserted, is coaxially formed in each of the hinge coupling protrusions and the rear end portion of the second finger.

4. The shipping comb as claimed in claim 1, wherein the first finger is inserted between the load beams as the frame is coupled to the actuator and rotated in a first direction, and then the second finger is inserted between the sliders as the second finger is rotated in the first direction.

5. The shipping comb as claimed in claim 1, wherein an installation hole is formed in the swing arm of the actuator and an installation rod to be inserted in the installation hole is provided at an end portion of the frame.

6. The shipping comb as claimed in claim 1, wherein a tip end portion of the first finger is inclined to allow the first finger to be easily inserted between the load beams.

7. The shipping comb as claimed in claim 1, wherein the first finger contacts and supports each of the load beams in a state in which the first finger is inserted between the load beams.

8. The shipping comb as claimed in claim 1, wherein the second finger has a thickness smaller than an interval between the sliders so as not to contact the sliders when the second finger is inserted between the sliders.

9. The shipping comb as claimed in claim 1, wherein a tip end portion of the second finger facing the sliders has a shape corresponding to the shape of each of the sliders.

10. The shipping comb as claimed in claim 9, wherein the tip end portion of the second finger has a rectangular shape having an area larger than an area of each of the sliders.

11. The shipping comb as claimed in claim 1, wherein the shipping comb is formed of a conductive plastic material.

12. The shipping comb as claimed in claim 11, wherein the conductive plastic material includes carbon fiber.

13. The shipping comb as claimed in claim 1, wherein the first finger and the second finger are formed of different materials.

14. The shipping comb as claimed in claim 13, wherein the second finger is formed of a material softer than the first finger.

15. The shipping comb as claimed in claim 1, wherein a buffer member is attached to at least each of upper and lower surfaces of a tip end portion of the second finger.

16. The shipping comb as claimed in claim 15, wherein the buffer member is formed of a viscoelastic material.

17. A shipping comb for use when moving an actuator of a hard disk drive, the actuator including a swing arm installed on a base member of the hard disk drive and capable of pivoting, at least a pair of load beams coupled to an end portion of the swing arm, and at least a pair of sliders respectively coupled to the load beams to face each other, the shipping comb comprising:

a frame operative to be coupled to the actuator and capable of pivoting;

an installation rod provided at an end portion of the frame and inserted in an installation hole formed in the swing arm;

a first finger protruding from the frame and inserted between the load beams to maintain an interval between the load beams by contacting and supporting the load beams; and a second finger hinge-coupled to the frame and capable of horizontally pivoting with respect to the frame, the second finger being inserted between the sliders, and having a thickness smaller than an interval between the sliders to prevent collision between the sliders.

\* \* \* \* \*